(12) United States Patent
Bumbulis

(10) Patent No.: US 7,383,389 B1
(45) Date of Patent: Jun. 3, 2008

(54) CACHE MANAGEMENT SYSTEM PROVIDING IMPROVED PAGE LATCHING METHODOLOGY

(75) Inventor: Peter Bumbulis, Cambridge, CA (US)

(73) Assignee: Sybase, Inc., Dublin, CA (US)

(*) Notice: Subject to any disclaimer, the term of this patent is extended or adjusted under 35 U.S.C. 154(b) by 430 days.

(21) Appl. No.: 10/709,324

(22) Filed: Apr. 28, 2004

(51) Int. Cl.
  *G06F 12/00* (2006.01)
(52) U.S. Cl. .................. 711/130; 711/147; 711/150; 711/152
(58) Field of Classification Search .............. None
  See application file for complete search history.

(56) References Cited

U.S. PATENT DOCUMENTS

| | | | |
|---|---|---|---|
| 5,327,556 A | 7/1994 | Mohan et al. | 707/8 |
| 5,430,869 A | 7/1995 | Ishak et al. | 395/600 |
| 5,546,579 A | 8/1996 | Josten et al. | 707/8 |
| 5,574,902 A | 11/1996 | Josten et al. | 707/1 |
| 5,845,292 A | 12/1998 | Bohannon et al. | 707/202 |
| 5,870,763 A | 2/1999 | Lomet | 707/202 |
| 6,029,190 A * | 2/2000 | Oliver | 718/107 |
| 6,363,387 B1 | 3/2002 | Ponnekanti et al. | 707/10 |
| 6,490,594 B1 | 12/2002 | Lomet | 707/200 |
| 6,594,660 B1 | 7/2003 | Berkowitz et al. | 707/8 |
| 6,598,119 B2 | 7/2003 | Becker et al. | 711/119 |
| 6,606,626 B1 | 8/2003 | Ponnekanti | 707/8 |
| 6,615,317 B2 | 9/2003 | Roseborough et al. | 711/129 |
| 6,631,366 B1 | 10/2003 | Nagavamsi et al. | 707/3 |
| 6,728,840 B1 | 4/2004 | Shatil et al. | 711/137 |
| 6,772,179 B2 | 8/2004 | Chen et al. | 707/204 |
| 6,792,432 B1 | 9/2004 | Kodavalla et al. | 707/8 |
| 6,792,436 B1 | 9/2004 | Zhu et al. | 707/203 |
| 6,829,680 B1 | 12/2004 | Sugumar et al. | 711/137 |
| 6,848,028 B1 | 1/2005 | Sugumar et al. | 711/137 |
| 2002/0065992 A1* | 5/2002 | Chauvel et al. | 711/141 |
| 2005/0166206 A1* | 7/2005 | Parson | 718/104 |

OTHER PUBLICATIONS

Date, C.J., An Introduction to Database Systems, Ch 1: Overview of Database Management, vol. 1, 5th Ed., 1990.

* cited by examiner

*Primary Examiner*—Reginald Bragdon
*Assistant Examiner*—Thanh D Vo
(74) *Attorney, Agent, or Firm*—John A. Smart; G. Mack Riddle

(57) ABSTRACT

A cache management system providing improved page latching methodology is described. In one embodiment, for example, a method is described for providing access to data in a multi-threaded computing system, the method comprises steps of: providing a cache containing pages of data in memory of the multi-threaded computing system; associating a latch with each page in the cache to regulate access to the page, the latch allowing multiple threads to share access to the page for read operations and a single thread to obtain exclusive access to the page for write operations; in response to a request from a first thread to read a particular page, determining whether the particular page is in the cache without blocking access by other threads to pages in the cache; if the particular page is in the cache, attempting to obtain the latch for purposes of reading the particular page; and allowing the first thread to read the particular page unless a second thread has latched the particular page on an exclusive basis.

36 Claims, 8 Drawing Sheets

CACHE MANAGEMENT SYSTEM PROVIDING IMPROVED PAGE LATCHING METHODOLOGY

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size: 123126 Bytes, created: Apr. 15, 2004 4:31:34 PM; Object ID: File No. 1; Object Contents Source code.

BACKGROUND OF INVENTION

1. Field of the Invention

The present invention relates generally to information processing environments and, more particularly, to a cache management system providing improved page latching methodology.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

Caching data is an important performance optimization that is employed in database systems as well as a large number of other systems and applications. The premise behind caching data is that most programs (e.g., application programs) typically access data that is primarily localized within a few files or pages. Bringing that data into memory and keeping it there for the duration of the application's accesses minimizes the number of disk reads and writes the system must perform. Without caching, applications require relatively expensive disk operations every time they require access to the data.

In the context of a database management system, a cache is typically employed to hold database files in memory. FIG. 1 is a high-level block diagram illustrating data structures of a cache. Database files are typically organized as an array of fixed-size units referred to as "pages". A cache entry typically holds a single page image. These images are usually stored in any array 110 to satisfy alignment requirements. Typically the cache is not large enough to hold the entire database and as a result pages must be brought into (and out of) the cache in response to requests for access to particular data. In addition, the requests for access to particular data include both requests to read data as well as requests to write data (e.g., create or update data records). Accordingly, management of the cache includes not only managing the process of bringing items into and out of the cache, but also involves coordinating read and write access to the data. For example, if a writer were updating a page, one would like to ensure that no readers have access to the page until the update was finished. Thus, in conjunction with management of the cache, state information 120 is also maintained for each entry (e.g., an ordinal indicating what page it contains, an indicator indicating whether or not it has been changed, etc.). The data structure holding the state information 120 for a cache entry (referred to herein as "page infos" or "infos") may be inlined with the page images or may be maintained in a separate data structure as illustrated at FIG. 1.

Cache entries are typically indexed in order to facilitate access. For example, an array 130 indexed by a hash of the page name could be used to enable efficient by name look up. As illustrated at FIG. 1, to find the cache entry for a particular page by name, one would hash the page name and use the result as an index into an array 130 to obtain a pointer to a cache entry. It is possible that more than one page in the cache may have a name that hashes to a given value, and therefore the pointer in the indexed array 130 becomes a pointer to a chain or list 140 (referred to herein as "cache chains") of cache entries. However, searching the cache chains 140 is still much faster than searching a list of all of the cache entries one by one in order to locate a particular page of interest.

The process of searching for a particular page in the above-described cache typically proceeds as follows. A search for a page having a particular name would start with hashing the name and using the result as an index into an array 130 of cache chains. The search would then follow the pointer(s) through the entries (if any) of the designated cache chain. If a cache entry for the page is found in the cache chain, this is known as a "cache hit". However, if the page is not found in the cache, this is known as a "cache miss". In the event of a cache miss, the page is brought into the cache (e.g., from disk) and its cache entry is linked into the appropriate cache chain. Adding a page to the cache can involve evicting a page from the cache to free up a cache entry for the new page.

The above approach is widely used and works well in single-threaded environments. However, in a multi-threaded environment the above-described cache structure may be problematic. For example, a cache chain (i.e., linked list)

accessed by a particular thread may not be in good shape because another thread is currently in the process of updating the linked list. As another example, two threads may attempt to update the same page at the same time, which may result in lost updates. In order to address these kinds of problems in a multi-threaded environment, the traditional solution is to have a mutex (or mutual exclusion object) associated with each of the cache chains, in order to manage concurrent access to such cache chains as well as updates to the page state information found in the infos (the state for the latches used to control access to the page contents are typically found here). The mutex (mutual exclusion object) is a program object that allows multiple program threads to share the same resource, such as file access, but not simultaneously. As illustrated at FIG. 1, an array element 135 at the head of a particular cache chain includes a mutex for managing access to its cache chain.

Updating a particular page in a traditional cache using chain mutexes as described above generally proceeds as follows. The thread performing the update locates the cache chain containing the page and then acquires the chain's mutex. After finding the page's cache entry on the chain, the thread acquires exclusive access to the page (effectively by manipulating some of the state in the info associated with the cache entry, while under the guard of the mutex). Obtaining exclusive access might involve waiting for other thread(s) to finish with the page. If this is the case the chain mutex will be given up temporarily, and then re-acquired. Once exclusive access is acquired, the mutex is released. After making the desired update to the page, the thread then relinquishes the exclusive access granted to it (typically requiring the acquisition of a mutex, manipulating some state, and then the release of that mutex). The above is a general example of the operations that may be required to update a page. Those skilled in the art will appreciate that variations are possible. Significantly, a similar process is also involved when a thread is simply reading a page that is in cache.

A disadvantage of the above approach in a multi-threaded environment is that the above process of managing access to pages in the cache has adverse implications on the overall performance of the system maintaining the cache (e.g., a database management system). Typically, the most common cache operation performed is obtaining read access to a page that is already in cache. For example, in a multi-threaded, multi-processor database system environment, a page that is often of interest is the root page of an index. It is quite likely that multiple threads may frequently try to read this particular page. However, as only one thread at a time may obtain a mutex, "convoys" can result when threads queue to wait for the chain mutex associated with this page (which must be acquired and released during the process of finding the cache entry for the page and obtaining shared access to it). For example, five threads may be attempting to obtain shared access to the page containing the index root page, but the serial nature of obtaining the mutex means that only one can do so at a time, thereby slowing down overall system performance.

Another problem is the number of mutex operations that are required. For example, in the above-described environment, four operations are typically required in order to read a page. A thread must first obtain and release a mutex in order to obtain read access to the page. After reading the page, the thread must also obtain and release a mutex in order to relinquish the granted read access. Acquiring and releasing a mutex typically is implemented using a "compare and swap" or some other synchronizing instruction. These instructions are typically much more expensive, in terms of system performance, than one might expect for the fairly simple operations they perform. Because these operations are expensive, it would be preferable to use as few of them as possible, thereby enabling overall system performance to be improved.

What is needed is an improved cache management solution that reduces the number of expensive, serializing operations that are performed and thereby provides improved system performance. In particular, a solution is needed that provides improved performance in a multi-threaded, multi-processor environment. The present invention provides a solution for these and other needs.

SUMMARY OF INVENTION

A cache management system providing improved page latching methodology is described. In one embodiment, for example, a method of the present invention is described for providing access to data in a multi-threaded computing system, the method comprises steps of: providing a cache containing pages of data in memory of the multi-threaded computing system; associating a latch with each page in the cache to regulate access to the page, the latch allowing multiple threads to share access to the page for read operations and a single thread to obtain exclusive access to the page for write operations; in response to a request from a first thread to read a particular page, determining whether the particular page is in the cache without blocking access by other threads to pages in the cache; if the particular page is in the cache, attempting to obtain the latch for purposes of reading the particular page; and allowing the first thread to read the particular page unless a second thread has latched the particular page on an exclusive basis.

In another embodiment, for example, a system of the present invention is described for providing access to data in a multi-threaded computing system, the system comprises: a cache containing pages of data in memory of the multi-threaded computing system; a latch associated with each page in the cache to regulate access to the page, the latch allowing multiple threads to share access to the page for read operations and a single thread to obtain exclusive access to the page for write operations; and a cache manager for receiving a request for reading a particular page from a first thread, determining whether the particular page is in the cache without blocking access by other threads to pages in the cache, attempting to obtain the latch for reading the particular page if the particular page is in the cache; and allowing the first thread to read the particular page unless another thread has latched the particular page on an exclusive basis.

DETAILED DESCRIPTION

Glossary

Figure 1:
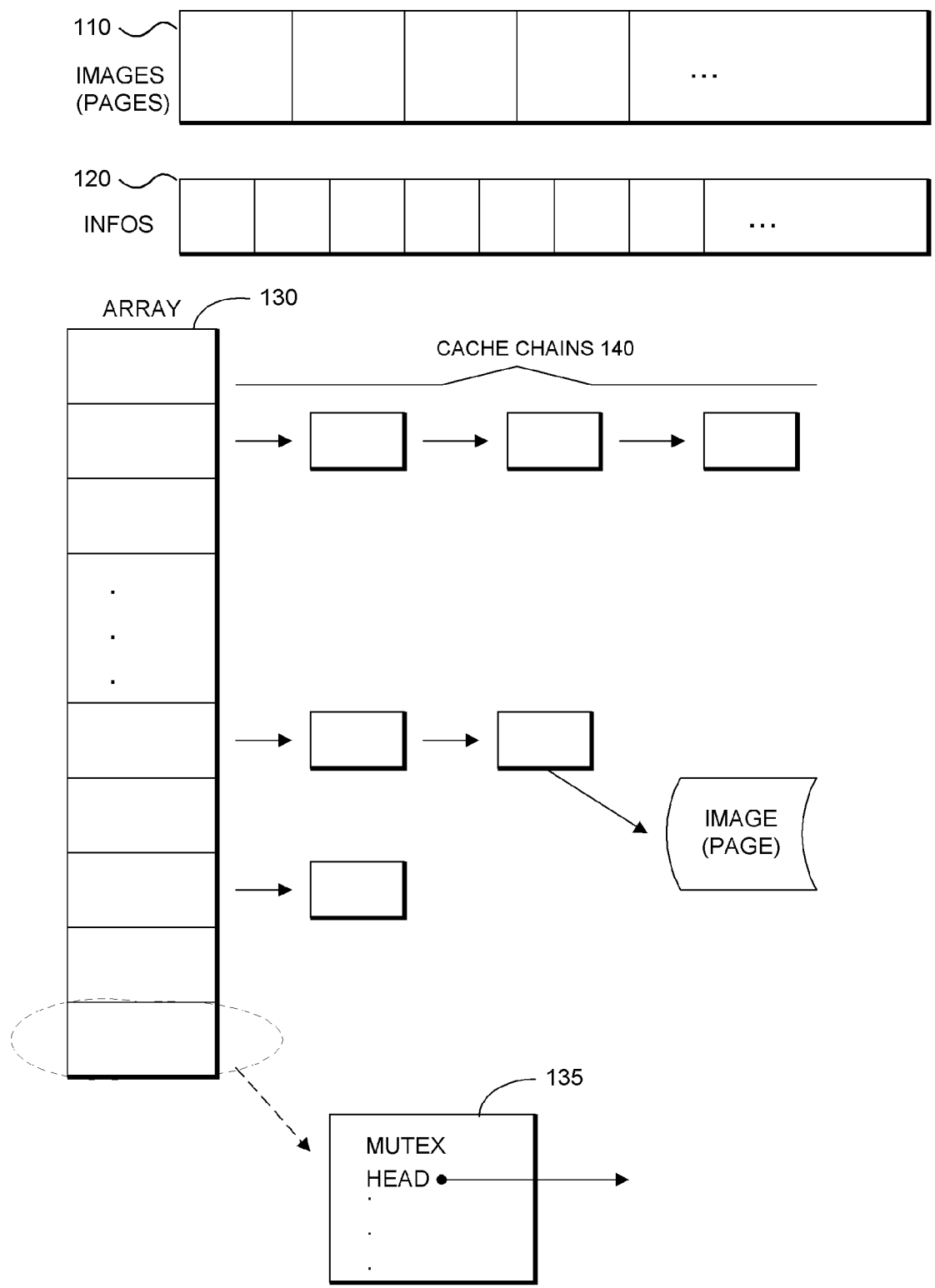
FIG. 1 is a high-level block diagram illustrating data structures of a cache used for maintaining data in system memory.

The following definitions are offered for purposes of illustration, not limitation, in order to assist with understanding the discussion that follows.

Cache: Cache refers generally to a store for frequently-used data or files. Data can be accessed from a cache more quickly than from its original source (e.g., a hard disk). When a program (e.g., an application program) needs to access particular data, it first checks the cache to see if the needed data is in the cache. Caching can dramatically improve the performance of applications and other programs, because accessing data in memory is much faster than accessing data from a hard disk. When data is found in the cache, it is called a cache hit, and the effectiveness of a cache is often judged by its hit rate. Without caching, relatively expensive disk operations are required every time access to data is required.

Mutex: Mutex is short for mutual exclusion object. In computer programming, a mutex is a program object that allows multiple program threads to share the same resource, such as file access, but not simultaneously.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)1999), the disclosure of which is hereby incorporated by reference.

Thread: A thread refers to a single sequential flow of control within a program. Operating systems that support multi-threading enable programmers to design programs whose threaded parts can execute concurrently. In some systems, there is a one-to-one relationship between the task and the program, but a multi-threaded system allows a program to be divided into multiple tasks. Multithreaded programs may have several threads running through different code paths simultaneously.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (E.G., for Desktop and Server Computers)

Figure 2:
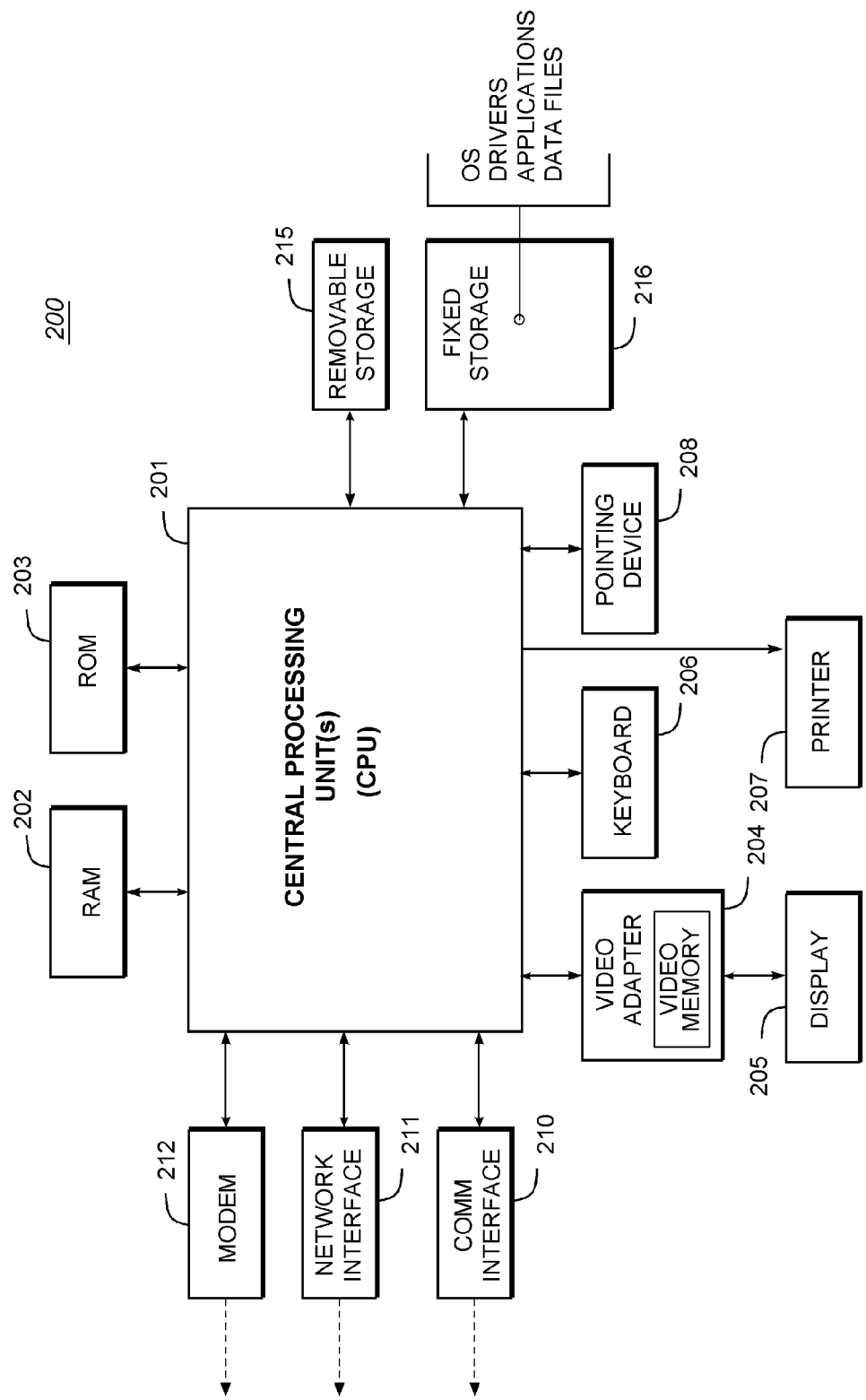
FIG. 2 is a very general block diagram of a computer system (e.g., an IBM-compatible system) in which software-implemented processes of the present invention may be embodied.

The present invention may be implemented on a conventional or general-purpose computer system, such as an IBM-compatible personal computer (PC) or server computer. FIG. 2 is a very general block diagram of a computer system (e.g., an IBM-compatible system) in which software-implemented processes of the present invention may be embodied. As shown, system 200 comprises a central processing unit(s) (CPU) or processor(s) 201 coupled to a random-access memory (RAM) 202, a read-only memory (ROM) 203, a keyboard 206, a printer 207, a pointing device 208, a display or video adapter 204 connected to a display device 205, a removable (mass) storage device 215 (e.g., floppy disk, CD-ROM, CD-R, CD-RW, DVD, or the like), a fixed (mass) storage device 216 (e.g., hard disk), a communication (COMM) port(s) or interface(s) 210, a modem 212, and a network interface card (NIC) or controller 211 (e.g., Ethernet). Although not shown separately, a real time system clock is included with the system 200, in a conventional manner.

CPU 201 comprises a processor of the Intel Pentium family of microprocessors. However, any other suitable processor may be utilized for implementing the present invention. The CPU 201 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 202 serves as the working memory for the CPU 201. In a typical configuration, RAM of sixty-four megabytes or more is employed. More or less memory may be used without departing from the scope of the present invention. The read-only memory (ROM) 203 contains the basic input/ output system code (BIOS)—a set of low-level routines in the ROM that application programs and the operating systems can use to interact with the hardware, including reading characters from the keyboard, outputting characters to printers, and so forth.

Mass storage devices 215, 216 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the removable storage 215 or fixed storage 216 into the main (RAM) memory 202, for execution by the CPU 201. During operation of the program logic, the system 200 accepts user input from a keyboard 206 and pointing device 208, as well as speech-based input from a voice recognition system (not shown). The keyboard 206 permits selection of application programs, entry of keyboard-based input or data, and selection and manipulation of individual data objects displayed on the screen or display device 205. Likewise, the pointing device 208, such as a mouse, track ball, pen device, or the like, permits selection and manipulation of objects on the display device. In this manner, these input devices support manual user input for any process running on the system.

The computer system 200 displays text and/or graphic images and other data on the display device 205. The video adapter 204, which is interposed between the display 205 and the system's bus, drives the display device 205. The video adapter 204, which includes video memory accessible to the CPU 201, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP LaserJet printer (available from Hewlett Packard of Palo Alto, Calif.), for creating hard copy images of output of the system.

The system itself communicates with other devices (e.g., other computers) via the network interface card (NIC) 211 connected to a network (e.g., Ethernet network, Bluetooth wireless network, or the like), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication (COMM) interface 210, which may include a RS-232 serial port, a Universal Serial Bus (USB) interface, or the like. Devices that will be commonly connected locally to the interface 210 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 3:
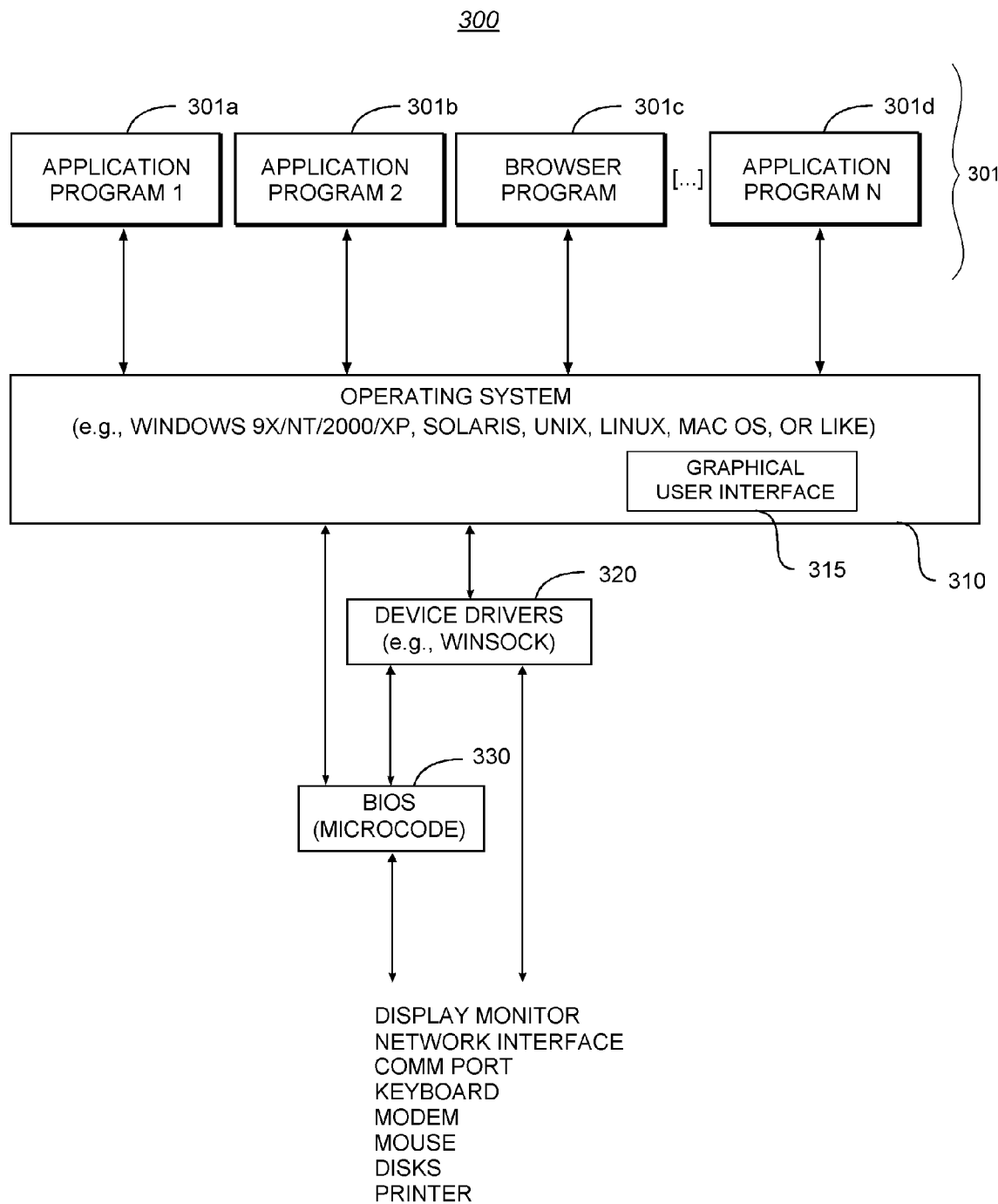
FIG. 3 is a block diagram of a software system for controlling the operation of the computer system.

FIG. 3 is a block diagram of a software system for controlling the operation of the computer system 200. As shown, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" 301 (e.g., 301a, 301b, 301c, 301d) may be "loaded" (i.e., transferred from fixed storage 216 into memory 202) for execution by the system 200. The applications or other software intended for use on the computer system 200 may also be stored as a set of down-loadable processor-executable instructions, for example, for downloading and installation from an Internet location (e.g., Web server).

Software system 300 includes a graphical user interface (GUI) 315, for receiving user commands and data in a graphical (e.g., "point-and-click") fashion. These inputs, in turn, may be acted upon by the system 200 in accordance with instructions from operating system 310, and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver—Windows' implementation of a TCP/IP stack) and the system BIOS microcode 330 (i.e., ROM-based microcode), particularly when interfacing with peripheral devices. OS 310 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 310 can also be an alternative operating system, such as the previously mentioned operating systems.

Client-Server Database Management System

Figure 4:
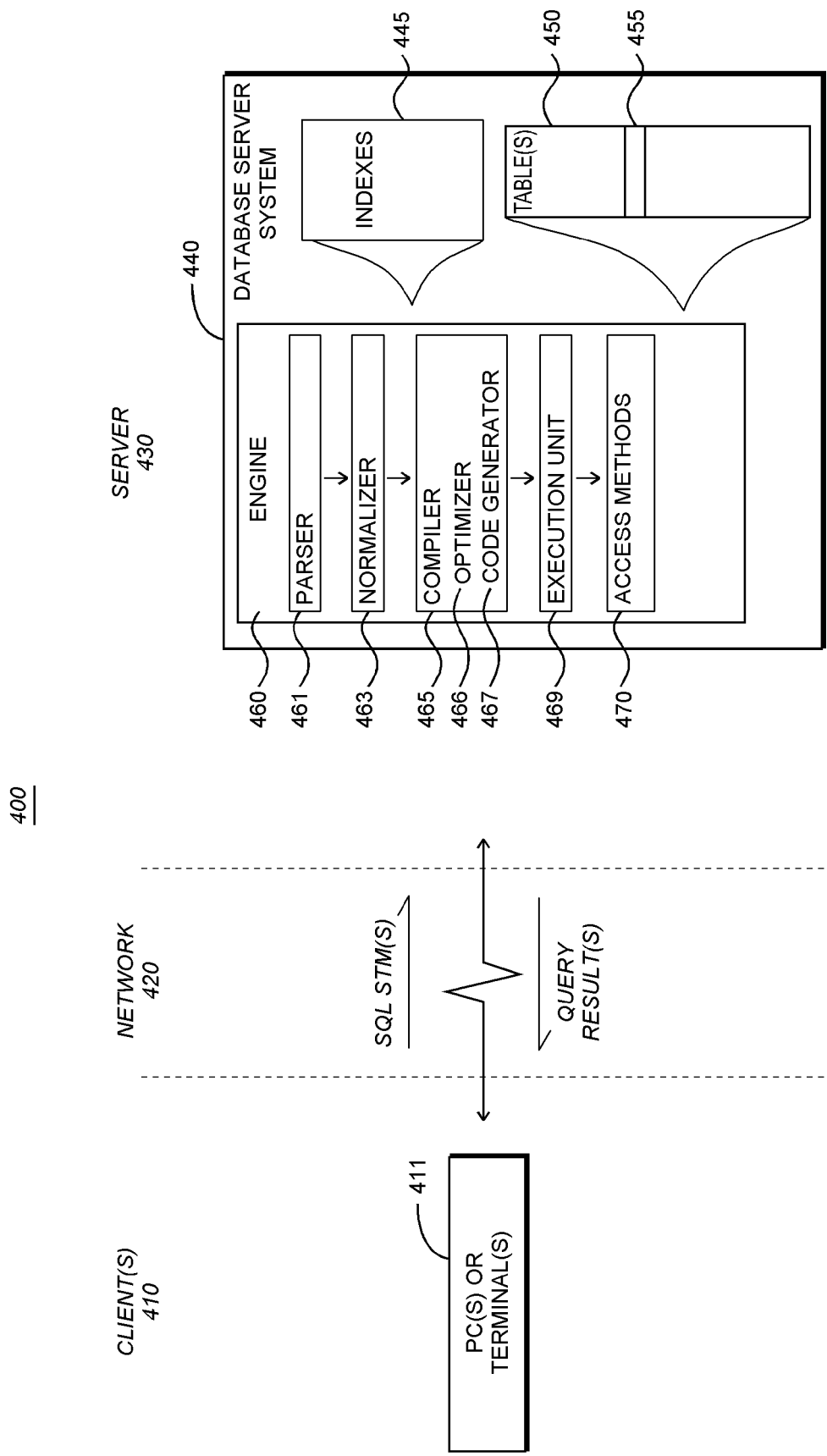
FIG. 4 illustrates the general structure of a client/server database system suitable for implementing the present invention.

While the present invention may operate within a single (standalone) computer (e.g., system 200 of FIG. 2), the present invention is preferably embodied in a multi-user computer system, such as a client/server system. FIG. 4 illustrates the general structure of a client/server database system 400 suitable for implementing the present invention. As shown, the system 400 comprises one or more client(s) 410 connected to a server 430 via a network 420. Specifically, the client(s) 410 comprise one or more standalone terminals 411 connected to a database server system 440 using a conventional network. In an exemplary embodiment, the terminals 411 may themselves comprise a plurality of standalone workstations, dumb terminals, or the like, or comprise personal computers (PCs) such as the above-described system 200. Typically, such units would operate under a client operating system, such as a Microsoft® Windows client operating system (e.g., Microsoft® Windows 95/98, Windows 2000, or Windows XP).

The database server system 440, which comprises Sybase® Adaptive Server® Anywhere Studio (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 420 may be any one of a number of conventional network systems, including a Local Area Network (LAN) or Wide Area Network (WAN), as is known in the art (e.g., using Ethernet, IBM Token Ring, or the like). The network 420 includes functionality for packaging client calls in the well-known Structured Query Language (SQL) together with any parameter information into a format (of one or more packets) suitable for transmission to the database server system 440.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Anywhere Studio, see, e.g., "Adaptive Server Anywhere 9.0.1: Core Documentation Set," available from Sybase, Inc. of Dublin, Calif. This product documentation is available via the Internet (e.g., currently at sybooks.sybase.com/aw.html). The disclosures of the foregoing are hereby incorporated by reference.

In operation, the client(s) 410 store data in, or retrieve data from, one or more database tables 450, as shown at FIG. 4. Data in a relational database is stored as a series of tables, also called relations. Typically resident on the server 430, each table itself comprises one or more "rows" or "records" (tuples) (e.g., row 455 as shown at FIG. 4). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 410 issue one or more SQL commands to the server 430. SQL commands may specify, for instance, a query for retrieving particular data (i.e., data records meeting the query condition) from the database table(s) 450. In addition to retrieving the data from database server table(s) 450, the clients 410 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 410 (via network 420) are processed by the engine 460 of the database server system 440. The engine 460 itself comprises a parser 461, a normalizer 463, a compiler 465, an execution unit 469, and an access methods 470. Specifically, the SQL statements are passed to the parser 461 which converts the statements into a query tree—a binary tree data structure which represents the components of the query in a format selected for the convenience of the system. In this regard, the parser 461 employs conventional parsing methodology (e.g., recursive descent parsing).

The query tree is normalized by the normalizer 463. Normalization includes, for example, the elimination of redundant data. Additionally, the normalizer 463 performs error checking, such as confirming that table names and column names which appear in the query are valid (e.g., are available and belong together). Finally, the normalizer 463 can also look-up any referential integrity constraints which exist and add those to the query.

After normalization, the query tree is passed to the compiler 465, which includes an optimizer 466 and a code generator 467. The optimizer 466 is responsible for optimizing the query tree. The optimizer 466 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 467 translates the query execution plan selected by the query optimizer 466 into executable form for execution by the execution unit 469 using the access methods 470.

All data in a typical relational database system is stored in pages on a secondary storage device, usually a hard disk. Typically, these pages may range in size from 1 Kb to 32 Kb, with the most common page sizes being 2 Kb, 4 Kb and 8 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 430 maintains one or more database indexes 445 on the database tables 450. Indexes 445 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 150). The present invention, however, is not limited to any particular environment or device configuration. Although the present invention is currently commercially embodied as a cache management component of a database management system, the present invention is not specific to databases and could be used in a number of other systems and applications in which there is a need for improved cache management. In addition, a client/server distinction is not necessary to the invention, but is used to provide a framework for discussion. Instead, the present invention may be implemented in any type of system architecture or processing environment capable of supporting the methodologies of the present invention presented in detail below.

Overview of Cache Manager Providing Improved Page Latching Methodology

The present invention provides a cache management system providing an improved page latching methodology. The basic approach of the present invention is to associate a latching mechanism with each page maintained in the cache. More particularly, a reader/writer latch is placed in a data structure associated with each page which is referred to herein as an "info". An "info" is the data structure in a cache entry that maintains state and control information about the cached page. The reader/writer latch of the present invention is implemented in a manner that enables multiple threads to concurrently obtain the latch for read access without blocking one another. In the common case, in which there is no contention for the latch, the reader/writer latch can be obtained with one "compare and swap" operation, which is less expensive, in terms of its impact on system performance, than typical prior art approaches for obtaining page access.

The use of a reader/writer latch associated with each page enables multiple threads to obtain access to and read a given page concurrently, without serializing at any point. In the event a thread is writing to a page, the page would then be latched on an exclusive basis and other threads seeking access would need to wait until the write operation was performed and the latch released. As read operations are typically performed far more frequently than write operations, the "convoying" effect of multiple threads performing a serializing operation is substantially reduced for frequently accessed pages. In addition, the multiple acquire/release mutex operations required to obtain page access/release with the prior art mutex approach (each typically requiring at least one "compare and swap" or equivalent instruction) are also avoided. Instead, only one "compare and swap" operation is required in most cases. As a result, the improved page latching methodology of the present invention provides improved performance compared to prior art cache management techniques.

It should be noted that in the currently preferred embodiment of the present invention each of the infos (data structures) maintained by the cache manager includes the name of the page to which the info relates. Accordingly, the normal rule implemented in the cache management system of the present invention is that if a thread is able to successfully latch a page and the name of the latched page matches the name of the page that the thread is searching for, then the correct page has been found. This means that the page latching methodology of the present invention may be applied irrespective of how the page was found. For instance, the page could be located as a result of scanning all of the infos or through the more typical method of going through a hash table or other index to locate the page. As another example, a thread could hold onto a pointer to the page in the hope that the pointer would still be good when referenced.

Typically, however, a given page is located as a result of going through a hash table or index as will now be described. In its presently preferred embodiment, the present invention employs an indexed array (or hash table) to facilitate access to pages in the cache based on the page name. In addition, a mutex is still employed in the cache chains as described above. However, in most cases searching for a page in cache does not require using the mutex. The approach of the present invention is to avoid using the mutex when possible. In order to look up a particular page (by name), one would perform a hash of the name and find the entry in the array (hash table) corresponding to the hash value of the name. Then, the search would proceed by walking along the linked list (cache chain) looking for the particular page having the given name. This search proceeds without any protection (i.e., it is thread unsafe), and there is some risk that the linked list could change (e.g., elements could be inserted or removed and so forth). As described below, the present invention includes mechanisms to avoid going into an infinite loop or triggering a general fault while looking for the page in this fashion. However, if the particular page is not found through this (unprotected) search process, then the basic approach of the present invention provides for a fall back procedure of using the mutex and proceeding in a secure fashion to locate the page. However, this is only necessary a small percentage of the time. In the common case, the page is found through the above (unprotected) search. The exceptions to this normal situation would include when the page is not in cache or another thread is in the process of updating the cache chain (linked list) that is being searched.

When latching a cache entry, the methodology of the present invention guarantees that if a thread needs to block while attempting to do so, that cache entry will not be reused for another page while the thread is blocked. This enables cache manager clients to continue to use resource ordering based on page name as a deadlock avoidance mechanism. In the usual case, a search for the page involves looking up the page in the array (hash table) and then walking through the linked list (cache chain) to find the page. Typically, the page will be in cache and there will not be any operations currently being performed on the linked list (e.g., because lists are intentionally kept relatively short, on average, to reduce the probability of such operations). Accordingly, locating and obtaining read access to a cached page involves, in the typical case, one "compare and swap" operation. Relinquishing access also involves only one "compare and swap". In the currently preferred embodiment, the array that serves as the index to the pages in cache is sized to provide, on average, one-half to one page per cache chain. This means that typically one would not have lengthy cache chains of pages, which provides for increased efficiency in performing the various cache operations hereinafter described.

The advantages of the present invention compared to prior approaches include that more than one reader (i.e., reader thread) can obtain access to a page concurrently. If multiple threads are reading the same page, there is no point at which the threads have to perform serializing operations, one-at-a-time, in order to read the page. This means that there is no possibility of a "convoy" of threads waiting in line to perform a particular operation that is performed serially in order to read a given page. This is particularly useful in improving access to pages that are frequently read (e.g., a page containing the root of an index), as multiple threads can read the page concurrently without having to serialize.

Another advantage of the methodology of the present invention is in reducing the number of expensive "compare and swap" or similar synchronization operations that are necessary. The methodology of the present invention typically involves one "compare and swap" operation in order to acquire the latch and a second to release it. In comparison, prior art approaches typically involved four "compare and swap" operations in order to perform similar actions. Thus, only half as many of these expensive operations are necessary, which serves to improve system performance given that these operations are typically performed quite frequently.

The methodology of the present invention provides that the operations that are performed most frequently can be performed more cheaply (i.e., using fewer system resources). In a small percentage of situations some incremental cost may be incurred when a page is not found and a thread-safe approach which involves using the mutex must be utilized. However, the incremental cost in this situation is minimal as the additional operation is a search through a linked list that is normally quite short and does not involve any expensive "compare and swap" type operations. In addition, this minor incremental cost is only incurred in a small percentage of cases. The system and methodology of the present invention provides improved performance on an overall basis as the operations that are performed more frequently are performed much more efficiently, while the number of cases in which the present invention results in some incremental system overhead is much smaller (i.e., these cases occur much less frequently).

System Components

The data structures utilized in the currently preferred embodiment of the cache management system of the present invention are described below. In addition, operations that are performed on these data structures are also described in order to illustrate the methodology of the present invention.

Figure 5:
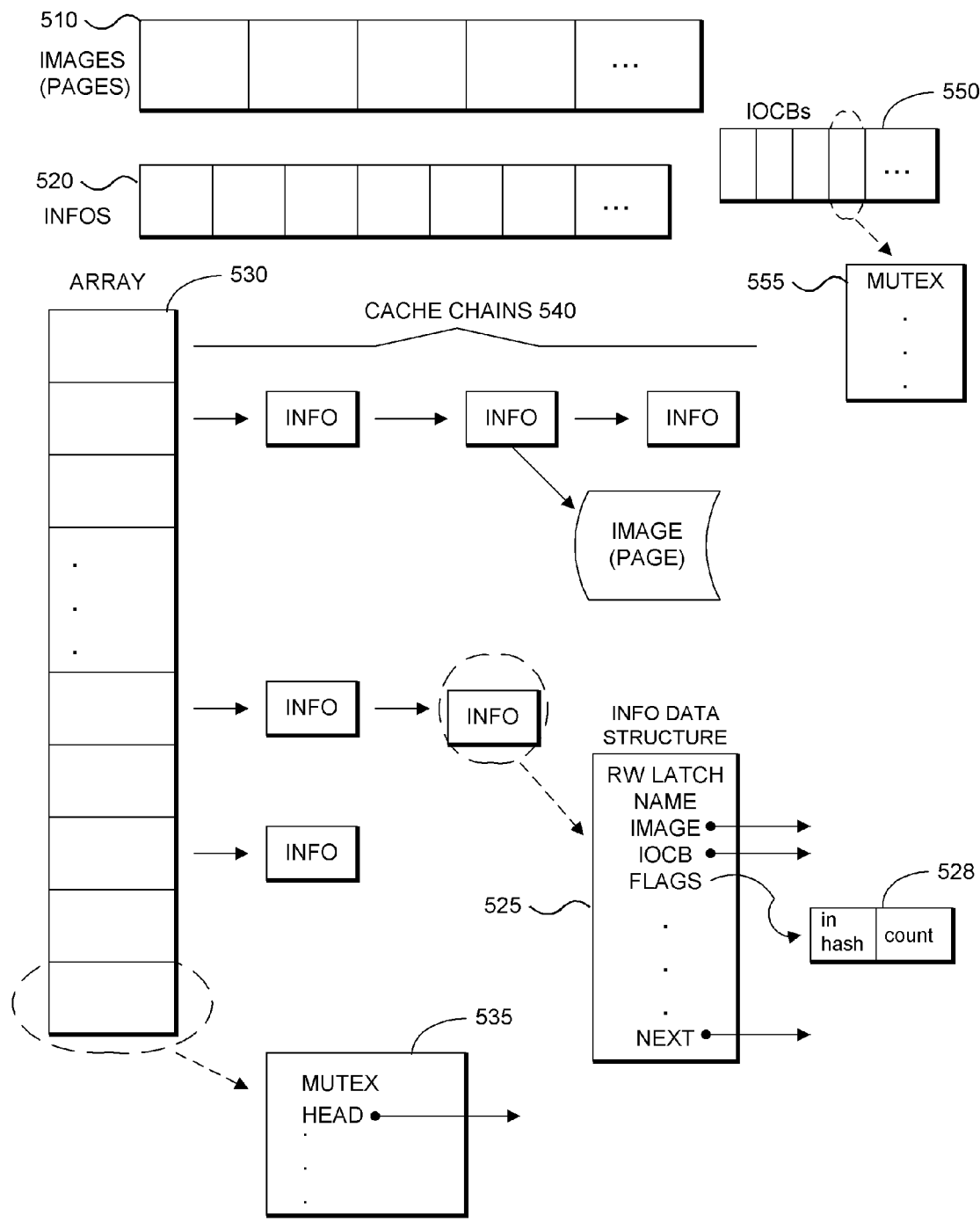
FIG. 5 is a block diagram illustrating the data structures utilized in the cache management system of the present invention and how the cache management system interacts with these data structures in operation.

FIG. 5 is a block diagram illustrating the data structures utilized in the cache management system of the present invention and how the cache management system interacts with these data structures in operation. As shown, these data structures include images (pages) 510, a set of infos (info data structures) 520, an (indexed) array 530, cache chains 540 accessible from the array 530, and input/output control blocks (IOCBs) 550. Each of these structures is described below in greater detail.

The images (pages) 510 comprise data images that are held in cache in fixed-size units referred to as "pages". In the following discussion, these data images will usually be referred to as "pages". In the currently preferred embodiment, the images 510 are stored in a number of arrays and the associated state/control information is not placed in line with the images. Instead, the state/control information is currently maintained separately in the "info" data structures 520. Among other reasons for maintaining this information separately is that operating systems typically have certain alignment requirements to facilitate performing certain operations (e.g., certain high performance input/output operations) on pages. However, it should be noted that the particular structure and allocation of the images (pages) is not essential to the implementation of the present invention.

The infos 520 represent an array of data structures maintaining state and control information regarding pages in the cache. An info data structure 525 depicts the elements or fields of one info data structure of the presently preferred embodiment. As shown, fields of the info data structure 525 include a RW Latch (reader/writer latch), a name (page name), a pointer to the page (image), a pointer to an I/O control block (IOCB), a flags field (Word), and a pointer to the next info structure in its cache chain. The RW Latch controls access to the page by (potentially) multiple threads and is used for serializing access if necessary (e.g., in the event of an update to the page). The latch also provides for non-blocking access enabling multiple threads to concurrently read the page. The name comprises the name of the page (i.e., a unique identifier of the page). The image field is a pointer to the actual data of the page. The iocb field typically contains a pointer to an input/output control block (IOCB) that maintains the state of an I/O operation, if one is being performed on the page (or NULL if no I/O is currently being performed). The iocb field can also contain a distinguished value JUST_INSTALLED if the cache entry has been assigned to a page, but does not yet have a valid image (the page needs to be read). IOCBs include a mutex for serializing access to the control block. The flags field is used as hereinafter described to ensure that a page is not reused while a thread is waiting for access to a page, thereby allowing clients to use resource ordering based on page name to avoid deadlocks. The info data structure 525 also includes a next pointer that points to the next info in the cache chain. The next pointer is NULL in the event that the info is at the end of the cache chain.

In the presently preferred embodiment, all of the address space utilized for the infos 520 is allocated in advance. It should be noted that the memory is not necessarily committed for all of the infos; however, the address space is reserved and a limit is placed on the maximum number of infos that may be utilized. The memory reserved for the infos is not used for other purposes while the system is in operation.

Among the reasons that this reserved memory is not used for other purposes is to avoid the possibility of following a bad pointer during an (unprotected) search of the cache chains for a particular page. Reserving memory assists in ensuring that all links contain pointers to infos as the address space containing the infos is not reused for anything else. The reserved address space may be used for other infos, but is not used for other purposes. Thus, the "next" field of any info will either point to another info or will be NULL. In some circumstances, the next field may contain a pointer to an info that does not have any useful information or to an info that is not expected, but it will not point to anything other than a (committed) info. Thus, during an unprotected search for a page, it is safe to continue following the pointers in the "next" fields of the linked list (cache chain) until reaching a field containing a NULL. It is possible that this type of unprotected lookup could still result in an infinite loop unless other measures were also used to guard against this eventuality. Therefore, additional measures are employed by the system of the present invention to avoid this type of error. Among these measures are that there can only be one entry in the cache with a given name (i.e., page name). In other words, there can only be one valid instance of a given name at any instant in time. Also, the infos in a particular cache chain are placed in order (e.g., in ascending order based on page name or in some other definite ordering). As a result, when proceeding through the linked list (cache chain), the ordering may be used to detect that some update or change has been made to the linked list. For example, if it is determined that the name of the current page name is out of order (e.g., is less than the prior page name in a case where ascending order is specified), this is an indication that the cache chain may have been updated. Those skilled in the art will appreciate that alternatively (or in addition), an infinite loop may be avoided by specifying a maximum limit on the search (e.g., a maximum number of pointers that may be followed before terminating an unprotected search of a cache chain).

In the event that an unprotected search is terminated (e.g., because a change or update in a linked list is detected), the approach of the present invention provides for performing a protected search/update. Generally, the lookup (search) proceeds using the mutex as with the previously described conventional approach. It should be noted that in the cache management system of the present invention as a general rule the latch (RW Latch) on the cache entry (i.e., info for a particular page) must be acquired before acquiring the mutex for the cache chain that contains the cache entry.

On the other hand, if a page is found during an unprotected traversal of a cache chain (an unprotected search), then the cache entry is latched using the RW Latch in the info. The process for latching a cache entry is described in more detail below in this document. The page may be latched on either an exclusive or a shared basis. A shared latch is used if a thread is only reading a page. This enables multiple threads to read the page concurrently without blocking each other.

The (indexed) array 530 comprises a data structure that facilitates access to the pages held in cache. In the presently preferred embodiment, pages are indexed by name with a hash function provided to create an index based on the page names of pages in cache. The hashed page names are used to create an array (i.e., a hash table) in which the page name can be used to look up a particular page. The array 530 comprises an indexed array that includes pointers to "info" data structures. In the currently preferred embodiment, the index is derived from the page name of the page(s) represented in the info data structures. An array element 535 illustrates the array structure in further detail. As shown, the array element 535 includes a mutex and a pointer (i.e., a pointer to the head of a linked list). To find a particular page, the page name hash can be used as an index into the array 530. One can then follow the pointer of the corresponding array entry to the data structure(s) (i.e., the info(s)) containing the page details. As previously described, it is possible that more than one page in the cache may have a name that hashes to a given value, and therefore the pointer in the indexed array 530) becomes a pointer to a cache chain 540 of the data structures (infos) representing particular pages in the cache. The cache chains 540 represent a linked list of infos (data structures) providing access to pages in the cache. The mutex shown in the array element 535 at FIG. 5 regulates access to a particular cache chain (linked list) in the event a destructive or potentially destructive operation is being performed on the cache chain. For example, the mutex would be used to obtain exclusive access in the event the cache chain is in process of being updated.

The input/output (I/O) control blocks (IOCBs) 550 comprise another set of data structures which are utilized by the cache manager of the present invention. The IOCBs 550 comprise an array of I/O control blocks for use in conjunction with input/output operations affecting pages in the cache. As shown, an input/output control block 555 includes a synchronization primitive (mutex) for serializing access to the control block by multiple threads.

Detailed Operation

Unprotected Search for a Page in the Cache

Figure 6A:
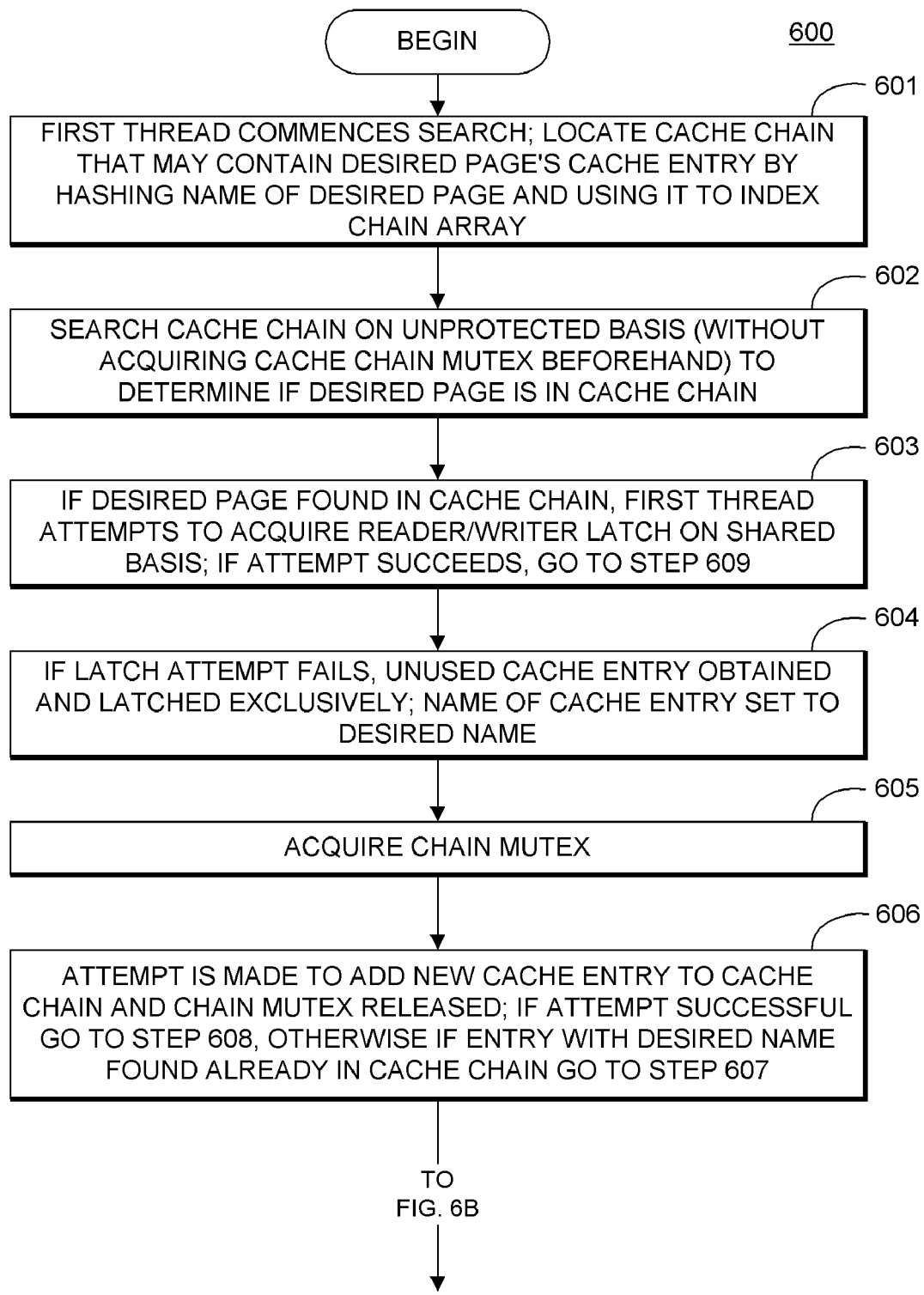
FIGS. 6A-B comprise a single flowchart illustrating the process of searching for a particular page in the cache utilizing the cache management system of the present invention.
Figure 6B:
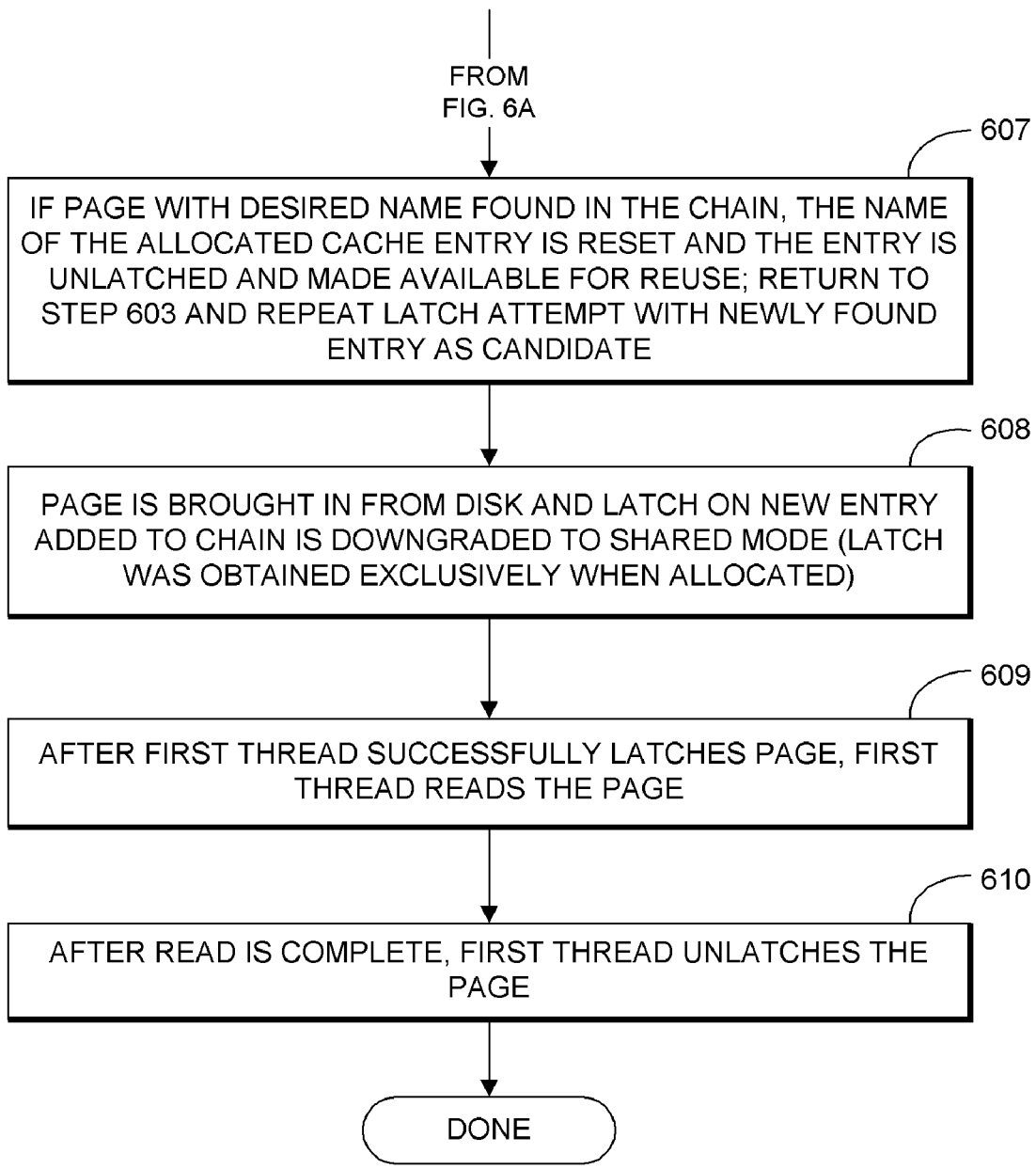

FIGS. 6A-B comprise a single flowchart 600 illustrating the process of searching for a particular page in the cache utilizing the cache management system of the present invention. The following discussion uses an example of a search for a particular database file page in a multi-threaded database management system as an example to illustrate the present invention. Those skilled in the art will appreciate, however, that the present invention is not limited to use in conjunction with database systems, but instead may be used in a wide range of other systems and applications. The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

The process of locating and reading a particular page in the above-described cache typically commences at step 601 with finding an index entry matching the name of the desired page. In the currently preferred embodiment in a multi-threaded database system environment, a first thread hashes the name of the desired page and uses this hashed value to index an array to locate the cache chain that would contain the page's cache entry, if the page were in cache. At step 602 the cache chain is searched on an unprotected basis (i.e. the cache chain mutex is not acquired beforehand) by starting with the entry referenced by head pointer (if any) and then following the next pointer(s) in the entries. The search fails when there are no more entries (a NULL pointer is found) or if two consecutive entries are found such that the second entry's name is not greater than the first's. As part of this process, the name of each entry is compared to the name of the desired page to look for a match.

If the desired page is found in the cache chain, at step 603, the first thread attempts to acquire the reader/writer latch on a shared basis. The attempt fails if the page is evicted from the entry during the attempt to acquire the latch. If the attempt succeeds the process is complete and the method proceeds to step 609 to read the page. If it fails, or if a matching entry was not found, the method proceeds to attempt to install a cache entry for the requested page. At step 604, an unused cache entry is obtained and latched exclusively. Also, the name of the cache entry is set to the desired name. At step 605, the chain mutex is then acquired. Next, an attempt is made to add the new entry to the chain at step 606 and the chain mutex subsequently released. This attempt fails only if an entry with the desired name is found to be already in the chain. If an entry with the desired name is found, the method proceeds to step 607. Otherwise, the method proceeds to step 608. If a page with the desired name is found to be already in the chain, the name of the allocated cache entry is reset, the entry is made available for reuse, and the entry is unlatched at step 607. The method then returns to step 603 and the latch attempt is repeated, but with the newly found entry (i.e., the newly found page having the desired name) as the candidate. If the new entry was added to the chain, then at step 608 the page is brought in from disk, the latch is downgraded to shared mode (it was obtained exclusively when allocated) and the method proceeds to step 609 to read the page.

After the first thread successfully latches the page, the first thread may then read the page at step 609. As previously noted, more than one thread may read the page concurrently as reader threads latch the page on a shared (non-exclusive) basis. After the read is complete, the first thread unlatches the page at step 610.

Page Latching

Figure 7:
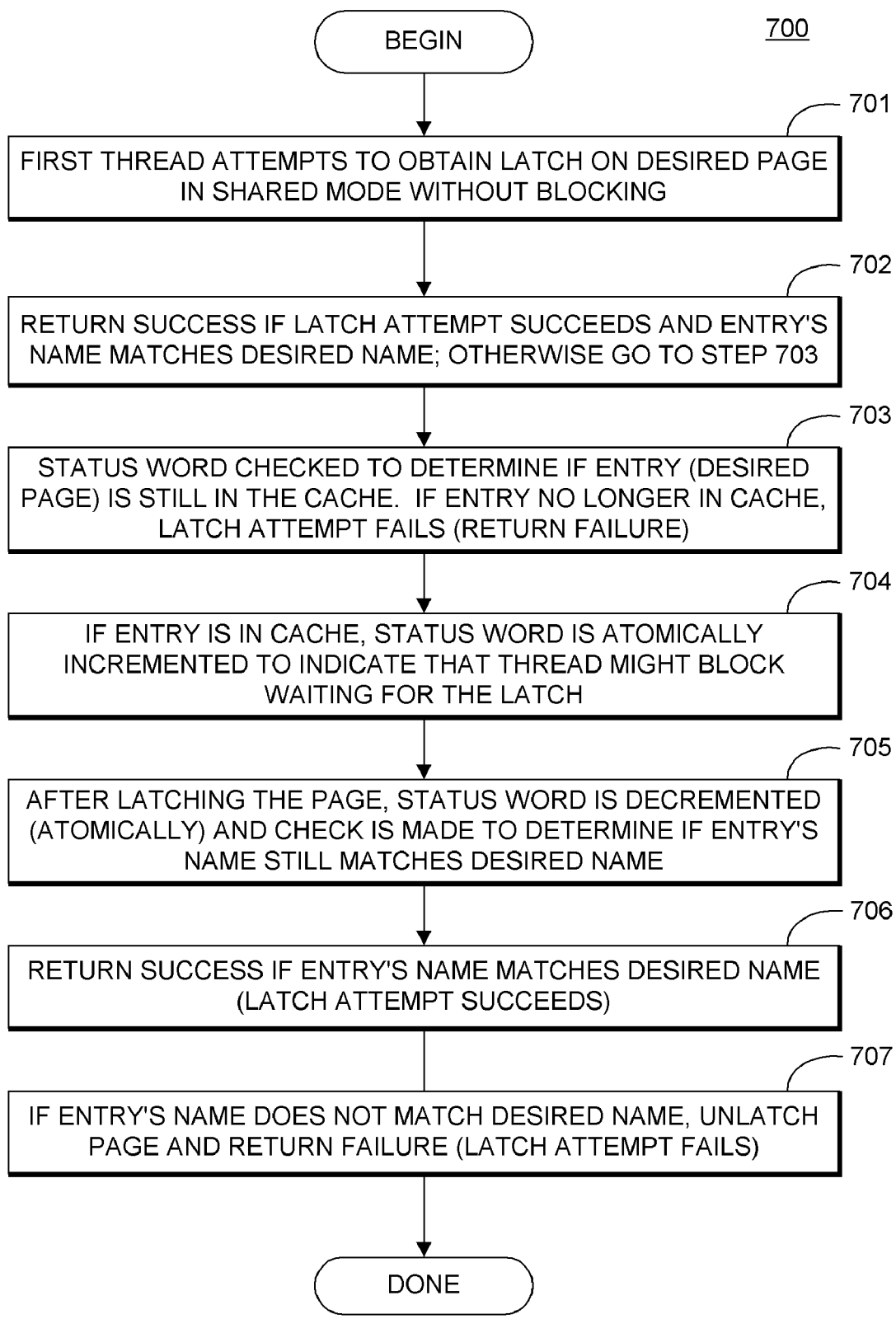
FIG. 7 is flowchart illustrating the methodology of the present invention for latching a page in further detail.

FIG. 7 is flowchart 700 illustrating the methodology of the present invention for latching a page in further detail. The method for latching the page for reading commences, at step 701, with an attempt by a first thread to obtain the latch in shared mode without blocking. If this is possible, the latching attempt succeeds if the cache entry's name still matches the desired name and fails otherwise. If the latching attempt succeeds and the entry's name matches the desired name, the method returns a success indication at step 702. However, if the first thread would have been forced to block, another thread must have the cache entry latched exclusively. Before the first thread retries the latch attempt with blocking, the first thread needs to ensure that the cache entry cannot be reused for a different page until the thread has finished with the latching attempt. To this end, the following steps are performed. At step 703, a status word is checked to determine if the entry is still in the cache. If the status word indicates that the entry is no longer in the cache (or if the entry's name no longer matches the desired name), the latching attempt fails (return failure). However, if the entry is in cache, the status word is atomically incremented at step 704 to indicate that the current thread might block waiting for the latch on the entry. The thread then waits on the latch until it is able to latch the page. After latching the page, the status word is decremented (atomically) at step 705 and a check is made to see if the entry's name still matches the desired name. If the entry's name matches the desired name, the latching attempt succeeds at step 706. If it does not match the desired name, the page is unlatched at step 707 and the method returns failure (indicating it was unable to latch the desired page).

Cache Manager Interface

The cache manager interface has several entry points enabling various operations to be performed. The following elements of the interface that are of particular interest are described below:

Latching a page: The cache manager provides two entry points for latching pages. One, "PageInfo::Latch", takes an info (implicit), a page name, and a latch mode (shared or exclusive) and returns true only if the info has the given name and could be latched in the requested mode. In particular, it will fail if the info is not associated with the expected page (i.e., with the given name). The other entry point, "Cache::LockRaw" takes a page name and a latch mode and returns an info for the requested page that is latched appropriately. If necessary, "Cache::LockRaw" will read the requested page from disk. "Cache::LockRaw" is implemented in terms of "PageInfo::Latch".

Unlatching a page: The entry point "PageInfo::Unlock" takes an info (implicit) as a parameter. It unlatches the specified page.

Hinting a page: The "Cache::Hint" entry point is used to inform the cache manager that a page will likely be requested in the near future. It takes a page name as a parameter. If the requested page is not currently in cache, the cache manager will take steps to retrieve the page from disk concurrently with other processing.

Removing a page: The "PageInfo::Evict" entry point is used to remove pages from cache. For example, a page may be removed from cache when a table is dropped and the page relates to the dropped table. Removing the page enables the space utilized by the page to be reused. "PageInfo::Evict" takes an info (implicit) as a parameter. It assumes that the info has been latched exclusively.

Latching a Page

If a page has been located, either by search based on page name or some other mechanism (e.g., by consulting a stored pointer to what is believed to be the correct page), the following "PageInfo::Latch" function can be used to latch the page on a shared or exclusive basis:

```
 1: a_bool
 2: PageInfo::Latch( a_cache_name name, a_bool shared )
 3: /*****************************************/
 4: // Block only for pages named name. Returns TRUE if latch has been
 5: // obtained (FALSE => the name of the info might have changed).
 6: {
 7:     if( _rw_latch->TryLatch( shared ) ) {
 8:         if( HasName( name ) ) {
 9:
10:             return(TRUE);
11:         }
```

-continued

```
12:        _rw_latch->Unlatch( );
13:    } else if( HasName( name ) ) {
14:        if( CanPreventReuse( ) ) {
15:            a_bool recycle;
16:            if( HasName( name ) ) {
17:                _rw_latch>Latch( shared );
18:                recycle = AllowReuse( );
19:                if( HasName( name ) ) {
20:                    return( TRUE );
21:                }
22:                if( recycle && !IsPinned( ) ) {
23:                    if(!shared || _rw_latch->TrySharedToExclusive( ) ) {
24:                        AddToReusable( this );
25:                    }
26:                }
27:                _rw_latch->Unlatch( );
28:            } else {
29:                // We just lost a race trying to latch page
30:                // so let the cleaner pick up the page.
31:                AllowReuse( );
32:            }
33:        }
34:    }
35:    return( FALSE );
36: }
```

As provided at line 2 above, this latching routine receives as input parameters a pointer to the candidate info that is believed to hold the desired page (implicitly via the "this" pointer), the page name of the page that is desired ("a_cache_name name"), and a boolean value ("a_bool shared") indicating whether shared or exclusive access to the page is desired. The function returns a boolean (a_bool) as follows: TRUE if it is successfully able to latch the desired page; and FALSE otherwise (e.g., if the page name desired does not match the actual name of the page). If FALSE is returned, the page is left unlatched, and the caller must either retry the operation or take some other action.

More particularly, at lines 7-12, if the info's latch can be acquired without blocking ("if (_rw_latch->TryLatch (shared))") and the desired page name matches the info's page name, then the routine simply returns TRUE indicating success. However, if the info does not have the desired page name, then the info is unlatched and the routine returns FALSE indicating failure. In the event the condition at line 7 is not satisfied, this indicates that another thread has (or had) the info latched exclusively. In this event, a check is made at line 13 to determine if the info still has the desired page name. If it does not have the desired name, then the routine will return FALSE. Otherwise, if the info does have the correct name, the routine next attempts to prevent the info from being reused for another page as provided at line 14 ("if (CanPreventReuse ( )"). If the call succeeds, another thread will be able evict the page currently held by the info, but the info will not be reused (in particular it will not be assigned a valid name) until the current thread permits its reuse with a call to "AllowReuse".

More particularly, in the preferred embodiment, a compare and swap operation is used to change the state of the above-described "flags" field (Word) of the page info data structure 425 (as illustrated at FIG. 4). As illustrated at FIG. 4, there are two parts to the flags field (Word) 428. The first part is an "in hash" bit that is set to indicate whether or not the info is in the hash (meaning that it has a valid name). The second part is a "count" which indicates the number of threads that are actively attempting to latch this info (i.e., the number of threads could potentially block waiting for another thread to finish with the info). The "CanPreventReuse" routine (repeatedly) attempts to atomically increment "count" while the "in hash" bit is set with a compare and swap operation. If the "CanPreventReuse" routine succeeds at this, it returns TRUE. However, if the "in hash" bit is cleared by another thread (indicating that the info is no longer in the hash) before "count" could be incremented, then the "CanPreventReuse" routine simply returns FALSE without incrementing "count" as the info is no longer of interest and there is no need to prevent its reuse.

Even if the current thread was successful at preventing the info's reuse, there is no guarantee that info is for the desired page (another thread might have successfully reused the page before the current thread could call "CanPreventReuse"). Accordingly, another check is made at line 16 to see if the info still has the desired page name. If it does not still have the page name (indicating a race was lost and it has been reused), the current thread does not continue to attempt to latch the info, and allows reuse of the info.

After the above steps, the thread blocks (as part of the call to "_rw_latch->Latch") until it is able to latch the info at line 17. Once the current thread acquires the latch, it stops blocking attempts to reuse the info by calling "AllowReuse" (which, in the preferred embodiment, atomically decrements the count of potential blockers using a compare and swap operation) at line 18. At this point, the routine has the latch on the info. If the name of the info matches the desired name, the desired page has been latched and the routine returns TRUE. If the info's name no longer matches the desired name, the info no longer holds the desired page (it was removed while the thread was waiting for the latch). Note that the latched info must not contain any page as the current thread was preventing the info's reuse. Also note that the desired page might have been reloaded into another info in the meantime. Before giving up the latch and returning FALSE a check is made to see if the info should be marked for immediate reuse.

At line 22, the "if (recycle && !IsPinned( ))" condition is satisfied if the page is no longer in the cache (i.e., if recycle is true) and if it is not being used for some other purpose (e.g., purposes other than a database file page). If the condition at line 22 is satisfied, then at line 23 an attempt is made to latch the info exclusively (if the info is not already latched exclusively). If an exclusive latch is obtained on the info, then the info is added to the reusable list as provided at line 24. This code is an optimization to indicate that the info is available for reuse. It should be noted that this is not the only way to identify infos that can be reused. A "cleaner" process is also provided in the presently preferred embodiment to periodically identify infos that are candidates for replacement or reuse.

Finding or Installing a Page in Cache

The following "Cache::LockRaw" routine is the function in the cache manager interface that is called by external clients if they are interested in obtaining a particular database page:

1: PageInfo * Cache::LockRaw(a_cache_name name, a_bool shared =

FALSE) {

2: PageInfo * info = Install(name, shared);

3: info->FinishLock(shared);

4: return(info);

5: }

The routine brings the page into cache, if necessary, and latches it as requested. A pointer to the cache entry (info) for the page is returned. At line 2, the call to "Install" ensures that there is a cache entry for the desired page (and that it is latched appropriately), and on line 3 "FinishLock" ensures that the contents are valid.

The following "Cache::Install" routine takes as input the name of a page that is desired and a boolean value indicating whether shared or exclusive access to the page is requested and returns a pointer to a cache entry containing the page, latched appropriately:

```
1: PageInfo *
2: Cache::Install(a_cache_name name, a_bool shared)
3:
/****************************************************/
5: CacheChain * chain = ChainFor(name);
6: PageInfo * info;
7: for(info = chain->Find(name);;) {
8:   if(info && info->Latch(name, shared)) break;
9:   PageInfo * alloc = Alloc( );
10:  info =AddToHash(chain, name, alloc);
11:  if(info == alloc) break;
12:  AddToReusable(alloc);
13:  alloc->Unlatch( );
14: }
15: return info;
16: }
```

The function initially determines the cache chain to be searched by hashing the page name and using the hash as an index into an array. Next, the "for" loop commencing at line 7 first attempts to find a cache entry for the page by name. As previously described, this involves going through the cache chain (linked list) in a thread-unsafe (insecure) fashion to try and find an entry with the given name.

If a candidate cache entry is found and the entry can be latched using the above-described latching routine as provided at line 8 ("if (info && info->Latch(this, name, shared))"), the function breaks from the loop and returns a pointer to the cache entry that was found and successfully latched. However, if the conditions at line 8 are not satisfied, then a new cache entry is allocated. Allocating a cache entry consists of exclusively latching a cache entry that is currently not in use. This might entail evicting a page that is currently in the cache to free up an entry. As provided at line 10, the "Cache::AddToHash" routine is then called.

As described below, the "Cache::AddToHash" function attempts to install "alloc" as the cache entry for the page named "name". It returns "alloc" if successful, and a pointer to an existing entry for "name" otherwise. If "alloc" was successfully installed, then the function breaks as provided at line 11. In this case, the cache entry returned is the newly allocated entry. Observe that the page still needs to be read from disk; this will be done later. However, as the cache entry has been latched exclusively, other threads will not be able to access the cache entry while it is in this state. If, however, an existing cache entry named "name" was found, then the allocated cache entry is made available for reuse and unlatched as shown at lines 12-13. The process then repeats with the newly found cache entry as the candidate entry. Theoretically, a live lock could occur here but in practice this is not a concern because of the page replacement scheme used in the currently preferred embodiment of the present invention. With this page replacement scheme, once a page is in cache it typically takes quite a while for the page to work its way out of the cache compared to the time for performing the foregoing operation. In theory cache entries for the requested page could be entering and leaving the cache as an insertion operation is proceeding. However, in practice this is unlikely to occur in the environment in which the cache manager of the present invention is currently implemented and used.

The following is the "Cache::AddToHash" function that is called by the above "Cache::Install" routine:

```
1: PageInfo *
2: Cache::AddToHash(CacheChain * chain, a_cache_name name, PageInfo * alloc)
3:
/****************************************************
******** ******/
4: {
5:   alloc->PrepareForAdd(name, _now);
6:   PageInfo * info = chain->FindOrInsert(name, alloc);
7:   if(info == alloc) {
8:     info->SetInHash(TRUE);
9:     info->_pending =(IOCB *) PageInfo::JUST_INSTALLED;
10: }
11: return(info);
12: }
``` it attempts to install "alloc" as the cache entry for the page named "name" on the cache chain "chain". It returns "alloc" if successful, and a pointer to an existing entry for "name" otherwise. "Cache::AddToHash" initializes some bookkeeping information at line 5 with the call to "PrepareForAdd", calls "CacheChain::FindOrInsert" (described below) to do the actual work, and does some post processing on "alloc" if it was successfully installed.

The post processing done on "alloc" consists of marking the cache entry as being in the cache (having a valid name) and flagging the new page as being just installed (indicating some additional operations will need to be performed in the near future). In any case, the info for the page that is found or created is returned to the calling function as provided above at line 11. The "FindOrInsert" function will next be described before describing the operations that are performed (if applicable) on a newly installed (just installed) cache entry.

The "CacheChain::FindOrInsert" routine called by the above function is as follows:

```
1: PageInfo *
2: CacheChain::FindOrInsert( a_cache_name name, PageInfo * insert )
3: /****************************************************
*****/
4: {
5:   _mutex->Get( );
6:   PageInfo * info;
7:   PageInfo ** pinfo;
8:   for( pinfo = &_head (info = *pinfo) != NULL; pinfo =
```

```
        &info->_next) {
 9:     if( info->_name.as_uint >= name.as_uint ) {
10:         if( info->_name.as_uint == name.as_uint ) got o done;
11:         break;
12:     }
13:   }
14:   insert->_next = info;
15:   *pinfo = info = insert;
16: done:
17:   _mutex->Give( );
18:   return info;
19: }
```

The above function initially acquires the cache chain mutex to ensure that no other thread will make changes to the chain while the following operations are performed. Next, the function goes through the chain to see if can find a cache entry with name "name". If such an entry is found, it is returned after releasing the chain mutex. However, if no such entry is found in the chain, the cache entry previously prepared by the calling function is inserted into the chain such that the chain remains in ascending order by page name. After the chain mutex is released, the page info is returned to the calling function. This "FindOrInsert" routine either finds an existing cache entry for the desired page (e.g., in the event another thread has already made the insertion) or it inserts the provided newly allocated cache entry into the cache chain.

The following "PageInfo::FinishLock" routine ensures that the data for the requested page is present in the cache entry:

```
1: void

2: PageInfo::FinishLock(a_bool shared)

3: /*******************************/

4: {

5: // . . .

6: if(JustInstalled( )) {

7: StartRead( )->Finish(TRUE, FALSE);

8: if(shared) {

9: _rw_latch->ExclusiveToShared( );

10: }

11: } else {

12: WaitForPending( );

13: }

14: }
```

As provided above at line 6, the "if(JustInstalled( ))" condition will be true if a new cache entry was just installed for the requested page, as previously described. If this condition is satisfied, an exclusive latch has already been obtained on the cache entry, so the page is synchronously read. If the client that called the cache manager only wanted shared access to the page, the latch is then down-graded from exclusive to shared access after the read is completed as provided at lines 8-9.

In some cases the page is already available (e.g., because the page was previously hinted and a read of the page was previously initiated). In this event, the above routine waits for this operation to be completed as shown above at line 12 and the following "PageInfo::WaitForPending( )" function is invoked:

```
1: void

2: PageInfo::WaitForPending( )

3: /************************/

4: {

5: IOCB * iocb = _pending;

6: if(iocb != NULL) {

7:   iocb->Latch( );

8:   if(_pending == iocb) {

9:     iocb->DoFinish(this, TRUE, FALSE);

10:   }

11:   iocb->Unlatch( );

12: }

13: }
```

Of particular interest, at line 5 above, this function references the I/O control block (IOCB) field previously discussed and illustrated at FIG. 4. Essentially, the IOCB contains information about a read or write that is in progress. If the iocb field is NULL, the page is ready for use. If iocb is not NULL, then the referenced IOCB is latched (i.e., its mutex is acquired) as provided at lines 6-7. It should be observed that it is safe to do this, as it is guaranteed that the iocb field will either point to an IOCB or be NULL. In the preferred embodiment this is guaranteed by pre-allocating a fixed array of IOCBs. Those skilled in the art will appreciate that other solutions are possible. Once iocb is latched, a check is made to determine if it has been reused for another read or write, as shown at line 8 ("if (_pending == iocb)"). The case of concern would be if "spending" went NULL because some other thread won a race for finishing the input/output operation. Observe that another thread cannot start a read or write on the current cache entry as the current thread has it latched (and exclusive access is required to start a read or write). In any case, in the event that "_pending" and "iocb" do not match at line 8, this indicates that there is nothing further to do and the IOCB is unlatched (i.e. it's mutex is released). However, if the condition at line 8 is satisfied, this indicates that the current thread has won the race to finish the I/O operation. In this case, the current thread will wait until the read has finished and do any necessary post-processing on the page image. If multiple threads are trying to read the same page, then most of the threads will be blocked on this IOCB latch and only one thread will wait for the read to finish. Unlatching the IOCB on line 11 will let any other threads concurrently requesting shared access to proceed, if the current thread has requested shared access.

Unlatching a Page

The process of unlatching a cache entry is straightforward as illustrated by the following "PageInfo::Unlock( )" routine:

```
1: void

2: PageInfo::Unlock( )

3: /***************/
```

```
4: {
5: _rw_latch->Unlatch( );
6: }
```

As shown, all that needs to be done is to release the RW Latch contained in cache entry.

Hinting a Page

The following "Cache::Hint" function provides for commencing a read of a page that is (or soon will be) needed but is not in cache:

```
1: unsigned
2: Cache::Hint(a_cache_name name)
3: /*************************/
4: {
5: PageInfo * info = IsNotInCache(name);
6: if(info == NULL) {
7: return(0);
8: }
9: info->StartRead( )->Finish(FALSE, FALSE);
10: info->Unlock( );
11: return(1);
12: }
```

As provided at line 2, the input to the above function is a page name ("a_cache_name name"). At line 5, a check is made to determine if the page is in cache. If the page is not in cache, then the below "IsNotInCache" function returns an exclusively latched cache entry for the page. If the page is in cache, then the "IsNotInCache" routine returns NULL as there is no need to read in a page. However, if a cache entry is returned, then the read of the page into the cache entry is started as provided above at line 9. The above function does not wait for the read to complete before unlatching the page as shown at line 10.

The "Cache::IsNotInCache" function is as follows:

```
1: PageInfo *
2: Cache::IsNotInCache(a_cache_name name)
3: /*************************************/
4: {
5: CacheChain * chain = ChainFor(name);
6: PageInfo * info = chain->Find(name);
7: if(info == NULL) {
8: PageInfo * alloc = Alloc( );
9: info = AddToHash(chain, name, alloc);
10: if(info == alloc) return info;
11: AddToReusable(alloc);
12: alloc->Unlatch( );
13: }
14: return NULL;
15: }
```

Initially, a check is made to determine if the page is in cache as provided at lines 5-6. The check is made as an unprotected search of the cache as previously described. If the page is not found in cache at line 7 ("if (info == NULL)"), then a new cache entry is allocated. The function then tries to add the new cache entry to the hash as provided at line 9. This will either return the allocated entry or one that currently contains the requested page. If it returns the allocated entry, this indicates that the process of reading the page needs to be started as provided in the above "Cache::Hint" function. However, if the cache already contains an entry for the page, then there is likely no need to hint the page (e.g., because another thread may already have commenced a read of the desired page). In this case, the newly allocated cache entry is added to the reusable list and unlatched and the function returns a NULL to the caller.

Removing a Page

Evicting a page from the cache initially requires locating the cache entry for the page to be removed and obtaining an exclusive latch on it. After the cache entry has been successfully latched on an exclusive basis, the following "PageInfo::Evict" routine is called:

```
1: void
2: PageInfo::Evict( )
3: /***************/
4: {
5: WaitForPending( );
6: XM->RemoveFromHash(this);
7: _rw_latch->Unlatch( );
8: }
```

The above routine initially waits for the page to stabilize (e.g., for any outstanding reads or writes to finish). Typically the page will be stable. Of particular interest, a call is made to a "RemoveFromHash" function to remove the page as provided above at line 6. After the cache entry is removed from the hash, it is then unlatched as shown at line 7.

The following "Cache::RemoveFromHash" function is called by the above "PageInfo::Evict" routine:

```
1: a_bool
2: Cache::RemoveFromHash(PageInfo * info)
3: /**************************************/
4: {
5: CacheChain * chain = ChainFor(info->name( ));
6: a_bool was_dirty = info->Scrub( );
7: chain->Remove(info);
8: info->_name.as_uint = BOGUS_NAME;
9: a_bool reusable = info->SetInHash(FALSE);
10: if(reusable) {
11: AddToReusable(info);
12: }
13: return(was_dirty);
14: }
```

The above routine performs the core work of removing a page from cache. As shown at line 2, it receives as input a pointer to the cache entry (page info) to be removed. At line 5, the cache chain that includes the page is identified. A call to a "Remove" function (illustrated below) is then made at line 7 to remove the page. After the page info has been safely removed from the cache chain as hereinafter described, the name of the info is set to be a bogus (i.e., invalid) name. The info is then marked as not in the hash, which involves manipulating the flags of the page info as previously described (i.e., to set the "in hash" bit from true to false atomically). If no threads are waiting for the info (i.e., the count is equal to zero), then the info is added to the reusable list. In the common case, the last thread waiting on the info will add the info to the reusable list when the thread is done with the info. There is also another general mechanism to identify info that are reusable. Accordingly, the above should be considered as an optimization to add the info to the reusable list when it is not needed by another thread.

The "CacheChain::Remove" function which is called by the above "Cache::RemoveFromHash" routine is as follows:

1: void

2: CacheChain::Remove(PageInfo * remove)

3: /*************************************/

4: {

5: _mutex->Get( );

6: PageInfo * info;

7: PageInfo ** pinfo;

8: for(pinfo = &_head; (info = *pinfo) != NULL; pinfo = &info->_next) {

9: if(info == remove) {

10: *pinfo = info->_next;

11: break;

12: }

13: }

14: _mutex->Give( );

15: }

This function acquires the cache chain mutex, goes through the chain to locate the page info to be removed, and then removes the info from the chain. After these operations have been completed, the cache chain mutex is released.

Structure of Reusable List

The reusable list itself is structured as a double ended queue implemented as an array with pointers. Rather than protecting the queue pointers with atomic operations, mutexes, or the like, the approach of the present invention is to use thread-unsafe (insecure) operations. Thread-unsafe (insecure) operations are used because they are less expensive (in terms of their impact on system performance), and the reusable list is, in essence, a hint for identifying reusable infos. This approach results in improved performance as expensive operations (e.g., such as those involved when using a mutex) are avoided.

The following "Cache::AddToReusable" routine is called to add an info to the reusable list:

1: void

2: Cache::AddToReusable(PageInfo * info)

3: /*************************************/

4: {

5: info->_name.as_uint = BOGUS_NAME;

6: if(info->_pending != (IOCB *) PageInfo::REUSABLE) {

7: info->_pending = (IOCB *) PageInfo::REUSABLE;

8: }

9: _reusable.Enqueue(info);

10: }

Of particular interest at line 9, a call is made to the following "PageQueue::Enqueue" routine to place the info on the reusable list:

1: void

2: PageQueue::Enqueue(PageInfo * info)

3: /*************************************/

4: {

5: if(((a_ptrint) (info->_queue_slot - _tail)) >= _size ||

6: _queue[info->_queue_slot % _size] != info) {

7: if((_head - _tail) < (_size - _threshold)) {

8: _queue[(info->_queue_slot = _head++) % _size] = info;

9: }

10: }

11: }

The above routine first checks to make sure that there is room in the queue. If it is determined that there is room in the queue, then the page info is added to the queue.

The following "PageQueue::Dequeue" routine provides for removing infos from the queue:

1: PageInfo *

2: PageQueue::Dequeue( )

3: /*****************/

4: {

5: return((_head - _tail) > _threshold? _queue[(_tail++) % _size]
: NULL);

6: }

The methodology of the present invention provides for leaving a gap between the head and tail of the above double-ended queue to ensure that one end does not overtake the other as pages are added at one end of the queue and removed from the other end. In other words, at any instant in time there are a few free pages in the queue that cannot be utilized. However, this enables the use of non-atomic operations to add and remove pages from the queue, which enables overall system performance to be improved.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for providing access to data in a multi-threaded computing system, the method comprising:
   providing a cache containing pages of data in memory of the multi-threaded computing system;
   associating a latch with each page in the cache to regulate access to the page, the latch allowing multiple threads to share access to the page for read operations and a single thread to obtain exclusive access to the page for write operations;

in response to a request from a first thread to read a particular page, determining whether the particular page is in the cache without blocking access by other threads to pages in the cache, wherein said determining step includes determining whether the particular page is in the cache without acquiring any synchronization object controlling access to pages in the cache;

if the particular page is in the cache, attempting to obtain the latch for purposes of reading the particular page;

if the particular page is not in the cache, attempting to install a cache entry for the particular page, wherein said attempting to install step includes obtaining an unused cache entry and latching the unused cache entry on an exclusive basis; and allowing the first thread to read the particular page unless a second thread has latched the particular page on an exclusive basis.

2. The method of claim 1, wherein the pages of data comprise database file pages.

3. The method of claim 1, wherein said providing step includes organizing the pages of data in an array.

4. The method of claim 1, wherein said providing step includes providing an index facilitating access to pages in the cache.

5. The method of claim 4, wherein said step of providing an index includes providing an index based upon a unique identifier assigned to each page in the cache.

6. The method of claim 1, wherein said providing step includes maintaining state information for each page in the cache.

7. The method of claim 6, wherein said step of maintaining state information for each page includes assigning a unique identifier to each page.

8. The method of claim 7, wherein said unique identifier comprises a page name.

9. The method of claim 7, wherein said determining step includes determining whether the particular page is in cache based, at least in part, upon said unique identifier.

10. The method of claim 6, wherein the state information maintained for each page includes the latch for regulating access to the page.

11. The method of claim 1, wherein said allowing step includes allowing the first thread to read the particular page concurrently with another thread reading the particular page.

12. The method of claim 1, wherein said attempting to install step includes acquiring a mutual exclusion object (mutex) controlling access to a cache chain and attempting to install an unused cache entry in the cache chain.

13. The method of claim 1, further comprising:
if a second thread has latched the particular page on an exclusive basis, attempting to prevent reuse of the particular page.

14. The method of claim 13, wherein said attempting to prevent reuse step includes determining if the particular page is in the cache.

15. The method of claim 13, wherein said attempting to prevent reuse step includes incrementing an indicator associated with the particular page so as to indicate the first thread is waiting for access to the particular page.

16. A method for providing access to data in a multi-threaded computing system, the method comprising:
providing a cache containing pages of data in memory of the multi-threaded computing system;
associating a latch with each page in the cache to regulate access to the page, the latch allowing multiple threads to share access to the page for read operations and a single thread to obtain exclusive access to the page for write operations;
in response to a request from a first thread to read a particular page, determining whether the particular page is in the cache without blocking access by other threads to pages in the cache, wherein said determining step includes determining whether the particular page is in the cache without acquiring any synchronization object controlling access to pages in the cache;
if the particular page is in the cache, attempting to obtain the latch for purposes of reading the particular page;
allowing the first thread to read the particular page unless a second thread has latched the particular page on an exclusive basis; and
maintaining a list of reusable pages representing pages in the cache that are available for reuse, wherein the list of reusable pages is structured as a double ended queue and a gap is maintained between ends of the double ended queue.

17. The method of claim 16, further comprising:
identifying a page in the cache that can be reused; and
adding the identified page to one end of the double ended queue.

18. The method of claim 17, wherein said step of adding the identified page includes adding the identified page using thread-unsafe operations so as to provide improved system performance.

19. The method of claim 17, further comprising:
removing a page from the other end of the double ended queue when a page is needed.

20. The method of claim 17, wherein said step of removing the page includes removing the page using thread-unsafe operations so as to provide improved system performance.

21. A computer-readable medium having processor-executable instructions for performing the method of claim 16.

22. A system for providing access to data in a multi-threaded computing system, the system comprising:
a cache containing pages of data in memory of the multi-threaded computing system;
a latch associated with each page in the cache to regulate access to the page, the latch allowing multiple threads to share access to the page for read operations and a single thread to obtain exclusive access to the page for write operations;
a cache manager for receiving a request for reading a particular page from a first thread, determining whether the particular page is in the cache without blocking access by other threads to pages in the cache, attempting to obtain the latch for reading the particular page if the particular page is in the cache; and allowing the first thread to read the particular page unless another thread has latched the particular page on an exclusive basis, wherein the cache manager determines whether the particular page is in the cache without acquiring any synchronization object regulating access to pages in the cache; and
a list of reusable pages representing pages in the cache that are available for reuse, wherein the list of reusable pages is structured as a double ended queue and wherein the cache manager identifies a page in the cache that can be reused and adds the identified page to one end of the double ended queue.

23. The system of claim 22, wherein the pages of data comprise database file pages.

24. The system of claim 22, wherein the cache includes an array holding the pages of data.

25. The system of claim 22, wherein the cache includes an index facilitating access to the pages in the cache.

26. The system of claim 25, wherein said index is based upon a unique identifier assigned to each page in the cache.

27. The system of claim 22, wherein the cache includes state information for each page in the cache.

28. The system of claim 27, wherein the state information includes a unique identifier for each page.

29. The system of claim 28, wherein said unique identifier comprises a page name.

30. The system of claim 28, wherein the cache manager determines whether the particular page is in cache based, at least in part, upon said unique identifier.

31. The system of claim 22, wherein the cache manager allows the first thread to read the particular page concurrently with another thread reading the particular page.

32. The system of claim 22, wherein the cache manager attempts to install a cache entry for the particular page if the particular page is not found in cache.

33. The system of claim 22, wherein the cache manager attempts to prevent reuse of the particular page if another thread has latched the page on an exclusive basis.

34. The system of claim 22, wherein cache manager adds the identified page using thread-unsafe operations so as to provide improved system performance.

35. The system of claim 22, wherein the cache manager removes a page from the other end of the double ended queue when a page is needed.

36. The system of claim 35, wherein the cache manager removes the page using thread-unsafe operations so as to provide improved system performance.

* * * * *